United States Patent
Tao

(10) Patent No.: US 6,245,377 B1
(45) Date of Patent: Jun. 12, 2001

(54) METHOD OF STABILIZATION OF RICE BRAN BY ACID TREATMENT AND COMPOSITION OF THE SAME

(75) Inventor: Jiaxun Tao, Greenville, MS (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/366,922

(22) Filed: Aug. 4, 1999

(51) Int. Cl.$^7$ ................................. A23B 4/12; A23L 1/10
(52) U.S. Cl. ......................... 426/623; 426/626; 426/630; 426/805
(58) Field of Search ..................... 426/623, 626, 426/805, 630

(56) References Cited

U.S. PATENT DOCUMENTS

| | | |
|---|---|---|
| 3,946,115 | 3/1976 | Brever et al. ........................ 426/72 |
| 4,197,320 | 4/1980 | Betz et al. ........................... 426/2 |
| 5,047,254 | 9/1991 | Lee . |
| 5,053,235 | * 10/1991 | Alley et al. ......................... 426/630 |
| 5,084,289 | 1/1992 | Shin et al. . |
| 5,200,218 | * 4/1993 | Lasater et al. ..................... 426/805 |
| 5,281,732 | 1/1994 | Franke . |
| 5,462,967 | 10/1995 | Hayashi . |
| 5,597,599 | 1/1997 | Smith et al. . |
| 5,807,594 | 9/1998 | King et al. . |

FOREIGN PATENT DOCUMENTS

| | | | |
|---|---|---|---|
| 1570513 | * 7/1980 | (GB) | .................................... 426/626 |
| 2096049 | * 9/1985 | (JP) | .................................... 426/626 |

OTHER PUBLICATIONS

Coombs, H. G. W.; Wiedmeier, R. D.; Kent, B. A.; Bowman, B. R.; Walters, J. L; Rice bran with antioxidants as a supplemental feed for growing horses; J. Animal Science (1997) vol 75, No. Suppl. 1, pp. 114.

Don R. McCaskill and Frank T. Orthoefer; Storage Stability of Extrusion Stabilized and Parboiled Rice Bran; *Rice Science and Technology*, pp. 37–48, 1993.

M. C. Cabel and P. W. Waldroup; Researc Note: Ethoxyquin and Ethylendiaminetetraacetic Acid for the Prevention of Rancidity in Rice Bran Stored at Elevated Temperature and Humidity for Various Lengths of Time; *Poultry Science*, 68:438–442, 1989.

Daniel Martin, J. Samuel Godber, Gladness Setlhako, Lalit Verma and John Henry Wells; Optimizing rice bran stabilization by extrusion cooking; *Louisiana Agriculture*, vol. 36, No. 3, Summer 1993.

* cited by examiner

*Primary Examiner*—Helen Pratt
(74) *Attorney, Agent, or Firm*—Fulbright & Jaworski L.L.P.

(57) ABSTRACT

The present invention is directed to a method of stabilizing parboiled rice bran. The method requires adding an edible acid having antioxidative properties to parboiled rice bran to maintain the stability of the bran for at least a six month period of time at ambient conditions. The invention is also directed to a method of stabilizing parboiled rice bran for use in a food product in which acid having antioxidative properties is added to a parboiled rice bran food product in an amount of about 0.10% to about 2.0% by weight to maintain the stability of the food product for at least a six month period of time at ambient conditions. The invention further is directed to an animal feed that has an amount of stabilized parboiled rice bran, the animal feed generally including at least about 6 to 18% protein, about 1–2% to 29% fat, and optionally fiber and/or starch sources.

17 Claims, No Drawings

METHOD OF STABILIZATION OF RICE BRAN BY ACID TREATMENT AND COMPOSITION OF THE SAME

FIELD OF THE INVENTION

This invention relates to a method of stabilizing parboiled rice bran and particularly relates to a method for adding an acid to parboiled rice bran to maintain the stability of the bran for at least a 6-month period of time at ambient conditions.

BACKGROUND OF THE INVENTION

Most of the world production of rice is consumed as white rice with the hull and bran layer removed. The bran layer makes up about 8 to 10% of the rough rice weight and is rich in protein, lipids, certain vitamins and trace minerals. Recent studies have even indicated that a diet supplemented with rice bran may be an effective means of reducing serum cholesterol in humans. There is a great abundance of rice bran and it is an important source of high quality cooking oil, however, it is considered in most countries a by-product and is disposed of or immediately sold as animal feed. In spite of its being rich in protein, lipids and certain vitamins, several obstacles have hindered its utilization.

Rice bran has a high oil content of 15–29%, depending on milling procedures and hull contamination. Because of the high oil content, naturally present enzymes or enzymes produced as a result of microbiological activity, hydrolyzes the oil and cause it to become rancid. Rancidity in rice bran causes it to have a bitter and soapy taste. Since rancidity occurs very rapidly at room temperature, rice bran is used mainly as a high protein feed additive for feedstock.

In order to extent the shelf life of rice bran from rough or paddy rice for later consumption, it must be stabilized immediately after milling to minimize its free fatty acid (FFA) content. Studies have repeatedly shown that free fatty acids develop rapidly in untreated rice bran or loosely milled rice during the first few days or weeks after milling. This change profoundly affects the value of bran for the extraction of oil. As the FFA content rises, oil-refining losses increase proportionately. While oxidative changes in the rice bran also negatively impact oil quality, these changes are not as rapid or obvious. Therefore, primary attention has been focused on stabilization efforts directed to the destruction or inhibition of lipase, the enzyme responsible for FFA development, rather than to the auto-oxidative changes. Heat stabilization has been used to either reversibly inhibit or permanently denature the lipase enzyme that is primarily responsible for the hydrolytic degradation of the oil in the bran. Other attempts to stabilize rice bran have included dry heat, wet heat and extrusion methods.

Although hydrolytic rancidity can be controlled through extrusion stabilization, methods for controlling oxidative rancidity, which develops over longer periods of storage times, have not been found. Oxidative stability is dependent on endogenous antioxidant compounds such as tocopherols and oryzanols. Oxidative deterioration of fats generally occurs by a free radical mechanism. In the initiation step, an active hydrogen, especially in the presence of a metal catalyst, such as copper, is removed from a triglyceride to yield a free radical. The free radical can then combine with oxygen to form a peroxide-free radical, which removes hydrogen from another unsaturated molecule to yield a peroxide and a new free radical. This propagation stage becomes a chain reaction and may continue until the free radicals react with each other to form inactive products, leading to termination of the cycle.

Peroxides are the primary oxidation products. Peroxides are quite unstable and decompose into a range of secondary products, including aldehydes, alcohols and ketones, which produce the typical rancid oil aroma. It is only during the initial stages of oxidative deterioration that the peroxide value may be used to indicate oxidative deterioration. Peroxide value (PV) is a term used to qualify the content, expressed in milli-equivalents of peroxide per kilogram of sample (meq/kg), of all substances that oxidize potassium iodide under specified conditions.

Rice can be milled in the rough or paddy state or it can be parboiled prior to milling. Bran from rice that has been parboiled has been shown to exhibit a reduced level of FFA, as compared to unprocessed rice bran and to be more resistant to the development of FFA during storage. It is generally accepted that lipase enzymes are destroyed in the parboiling process, due to the treatment times and temperatures typically involved in parboiling. It appears that some pre-formed free fatty acids are apparently leached out, oxidized and/or complexed with starch, which accounts for the initial reduction in FFA in parboiled rice bran. However, the oil in parboiled rice and in bran from parboiled rice has been shown to be highly susceptible to oxidative deterioration. This is generally attributed to destruction or removal of natural antioxidants during parboiling.

It has been found that properly processed extrusion-stabilized rice bran from rough rice can be safely stored for up to one year at $\leq 22°$ C. in gas-permeable packaging. However, the maximum safe storage life of parboiled bran under the same conditions appears to be less than 3–4 months. There has been no known effective way to achieve a similar storage life for parboiled rice bran as elevated storage temperatures accelerate peroxide formation and the development of undesirable odors. There is a need for a stabilization method that not only prevents hydrolytic degradation, but also replaces the antioxidants that are lost in the parboiling process.

It would be advantageous to have a method of treating a parboiled rice bran so that it would be stable, i.e. have a peroxide value less than 20 meq/kg, for at least a 6-month period of time at ambient conditions.

It would additionally be advantageous to have a method of stabilizing a parboiled rice bran for use in a food product in which the food product containing the parboiled rice bran would maintain stability for at least a 6-month period of time at ambient conditions.

It would further be advantageous to have an animal feed comprising an amount of stabilized parboiled rice bran, in which the parboiled rice bran is stabilized by the addition of an edible acid having antioxidative properties to the parboiled rice bran to maintain the stability of the animal feed for at least a six month period of time at ambient conditions.

SUMMARY OF THE INVENTION

The present invention is directed to a method of stabilizing parboiled rice bran. The method comprises adding an edible acid having antioxidative properties to parboiled rice bran to maintain the stability of the bran for at least a six month period of time at ambient conditions.

The invention is also directed to a method of stabilizing parboiled rice bran for use in a food product in which acid having antioxidative properties is added to a parboiled rice bran food product in an amount of about 0.10% to about 2.0% by weight to maintain the stability of the food product for at least a six month period of time at ambient conditions.

The invention is further directed to an animal feed comprising an amount of stabilized parboiled rice bran, in which the animal feed generally includes at least about 6 to 18% protein, about 1–2% to 29% fat, and optionally fibre and/or starch sources, wherein the parboiled rice bran is stabilized by the addition of an edible acid having antinoxidative properties to the parboiled rice bran to maintain the stability of the animal feed for at least a six month period of time at ambient conditions.

DETAILED DESCRIPTION OF THE PREFERRED EMBODIMENT

The present invention is directed to a method for increasing the stabilization of parboiled rice bran and thus, extending its shelf life. The measure used to determine the level of stabilization of the parboiled rice bran is a peroxide value less than 20 meq/kg throughout at least six months storage at ambient conditions. Although peroxide value alone is not considered to be a definitive measure of stability, it is used as an initial target.

It has surprisingly been found that adding an edible acid having antioxidant properties, in certain weight percentage amounts, to parboiled rice bran will maintain the stability of the bran for at least a six month period of time at ambient conditions. It has also surprisingly been found that the use of parboiled rice bran in a food product that has acid added to it will maintain the stability of the rice bran food product for at least six months at ambient conditions. The addition of about 0.10 to about 2.0% by weight of acid, depending upon the form of the rice bran (extruded or non-extruded) and the kind of acid used, can maintain the stability of the parboiled rice bran for up to one year at ambient conditions.

The acid stabilized parboiled rice bran has been found to be highly effective as animal feed either by itself or when combined with other known animal feed ingredients. Rice bran itself is a high energy feed, with the exact energy value being dependent upon its fat, starch, protein and fibre content. The gross energy of rice bran for example is about 20.5 MJ/kg versus 17 MJ/kg for a highly oil supplemented high energy complete horse feed such as Winergy feed, and 15 MJ/kg for good hay. The net or useable energy from rice bran for maintenance is about 10 to 12 MJ/kg; is about 11 MJ/kg for the Winergy feed; and is about 5 MJ/kg for good hay.

As a feed for horses, stabilized parboiled rice bran has the natural advantage of the energy coming from fat rather than starch, in addition to a relatively high fibre content, so that it can be used as feed alone or mixed with a variety of other feedstuffs suitable for horses. The stabilized rice bran can provide a range of feeds that are designed to minimize gastrointestinal disturbances due to nutrient imbalances, yet provide the energy that a horse requires for whatever the horse is required to do. When parboiled rice bran is used as an energy enhancing feed, the aim is to provide energy to the horse without having to feed the horse more or as many cereals, while being able to maintain or increase the roughage intake. This kind of feed has both behavioral and metabolic advantages.

The stabilized rice bran can be processed to produce a number of feed formats including powder, pellet, extruded pellet or an agglomerate (i.e coarse grapenut like mix) or others known to one skilled in the art. The stabilized rice bran can be used as a complete feed by itself; or fed in combination with roughage such as hay; or stabilized rice bran pellets fed with a nutritionally complete feed; or as a partial replacement of an ingredient in a nutritionally complete feed; or the stabilized rice bran can be one component in a horse feed mix. A typical feed for horses could include about 6 to 18% protein, about 1–2% to 29% fat, optionally fibre and/or starch sources, and if desired a vitamin/mineral mixture.

It can also be used as an additive to pet food in forms such as pellets, extruded shapes, wet pet food, semi-moist pet food, dry pet food, pet treats and a pet drink as is known to one skilled in the art of manufacturing pet food. The stabilized rice bran can also be used in pellet or tablet form as a feed enhancer for horses and other domestic animals.

The stabilized parboiled rice bran can be used in human food such as cereal, power bars and drinks, in various kinds of health foods as an additive or in other kinds of food products. The stabilized parboiled rice bran can also be used as a plasma cholesterol lowering food material in different kinds of food products.

Parboiled rice bran can be utilized in products in both an extruded and non-extruded form. Depending upon the form of the rice bran, different kinds of acid and different amount have been found to be more effective than others. Studies have been undertaken to evaluate the use of certain acids as metal atom sequesters and as antioxidants. These "natural" antioxidants have the advantage that they can be added at higher, potentially more effective concentrations in food products. They also have potential customer appeal as they are naturally occurring compounds.

An antioxidant is an agent that inhibits oxidation and thus prevents the deterioration of material, such as fats and oils, through the oxidative process. An antioxidant is also known as a free radical scavenger. Any edible acid that has antioxidant properties can be used to treat the parboiled rice bran. Examples of these kinds of acids include ascorbic, ascorbyl palmitate and phosphoric acid, in addition to other ascorbic acid preparations, other forms of Vitamin C, and mixtures of any of the above. Other examples of acids having antioxidant properties are acacetin and rosmarinic acid, and phenolic compounds such as salicylic, cinnamic and trans cinnamic, synaptic, chlorogenic, quimic, ferulic, gallic, p-coumaric, vanillic acid and vanillian, and caffeic acids. However, an antioxidant mixture such as "Petox" (a combination of BHA, BHT and citric acids) has been found to not be effective when used alone.

The examples show that the shelf life of the stabilized parboiled rice bran can be extended for as long as six months, even with the existence of mineral and vitamin additives. The added acid provides an antioxidant function that is lacking in parboiled rice bran because of the loss of its natural antioxidants during the parboiling process.

EXAMPLES

Extruded and non-extruded parboiled rice bran was mixed with soy hulls, molasses, vitamin premixes, acid and water. The various acids were added to the parboiled rice bran product in which the total recipe contained at least 72% of the parboiled rice bran. The dry and liquid ingredients were mixed and then the final mixture was pelletized immediately. The pellets were dried to reduce moisture to approximately 8%. After cooling to room temperature, the bran pellets were packaged in either polyethylene bags, aluminum foil bags or multi-wall paper bags and stored at 38° C. for accelerated shelf life tests. Six weeks of storage at the elevated temperature of 38° C. is roughly equivalent to six months of shelf storage at ambient conditions.

In stability tests evaluating phosphoric acid, it was found that if phosphoric acid was added to the bran mixture prior to pelleting, it was possible to hold the PV of parboiled bran pellets below 20 meq/kg for 6 weeks of storage at 38° C. Petox by itself was not effective in reducing peroxide values, but it was found to have a synergistic effect when used with phosphoric acid as illustrated in Table 2, in which 1.0% (w/w) phosphoric acid was added to the pellets prior to pelleting and Petox, in an amount of 500 ppm diluted to a 1:30 ratio with water, was sprayed on the pellets.

In stability tests evaluating ascorbic acid, amounts of 0.10 to 1.2% (w/w) were added to the pellets prior to mixing. As illustrated in Table 1 and 3, after six weeks of storage at 38° C. bran pellets with 1.0% (w/w) ascorbic acid had a PV as low as 6.5 meq/kg. An amount of 0.3%, and possibly even as low as 0.10% of ascorbic acid can be sufficient to keep bran pellets stable throughout six weeks of storage at 38° C. A preferred amount is about 0.25 to about 1.5% (w/w). The effect of ascorbic acid appears to be somewhat dependent upon the form of the parboiled rice bran prior to pelletizing (extruded or non-extruded). The combined use of ascorbic acid and Petox also provides a synergistic effect as illustrated in Table 3.

Ascorbyl palmitate in amounts of about 0.3 to 1.0% (w/w) was found to be highly effective on the stability of both extruded and nonextruded bran. The PV after six weeks was as low as 1.5 meq/kg as illustrated in Table 4 and 5. A preferred amount is about 0.10 to about 1.5% (w/w). The superior results for extruded parboiled rice bran may be the result of the combination of heat stabilization (extrusion) and the acid treatment. This combination can result in a shelf-life of one year at ambient conditions and the use of acid levels as low as 0.10% (w/w).

The above described samples have also remained stable at ambient conditions for over six months and have displayed the same peroxide values as described above for 6 weeks of storage at 38° C.

TABLE 1

Effects of Different Concentrations of Ascorbic Acid on the Stability of Pellets Made from Non-extruded Rice Bran

| Sample | Treament | 0 week | 2 week | 4 week | 7 week | 8 week |
|---|---|---|---|---|---|---|
| RCK | NE, 0 acid | 6.5 | 40.9 | 47.1 | 65.6 | |
| R1A | NE, 0.1% A | 2.7 | 9.2 | 17.4 | 38.6 | |
| R2A | NE, 0.3% A | 2.5 | 16.9 | 37.0 | 14.7 | |
| R3A | NE. 0.5% A | 3.2 | 2.9 | 4.6 | 11.9 | |
| R4A | NE, 0.7% A | 2.5 | 3.0 | 1.7 | 13.7 | |
| R5A | NE, 1% A | 2.0 | 6.6 | 1.9 | — | 34.9* |
| R6A | NE, 1.2% A | 1.0 | 4.6 | 1.2 | — | 27.4* |

Notes:
Peroxide value tested after x weeks of storage at 38° C.
*This data was tested at a different time and by different analysers.
EB = Extruded Bran NE = Non-extruded Bran
P = Phosphoric Acid A = Ascorbic Acid

TABLE 2

Effects of AA and AO on Pellets' Stability for Different Time of Storage at 38 C. (with non-extruded parboiled rice bran)

PV

| Wks at 39° C. | 0 | 2 | 4 | 6 | 9 |
|---|---|---|---|---|---|
| CK ■ | 11.20 | 19.40 | 44.70 | 78.40 | 127.00 |
| CK + AO ◇ | 8.40 | 25.20 | | 64.60 | 88.00 |
| CK + AA ✶ | 3.90 | 3.40 | 4.50 | 6.50 | 24.50 |
| CK + A + AO ⊟ | 2.90 | 3.19 | | 3.01 | 6.50 |

CK = Control, AA = Ascorbic Acid, AO = Antioxidant (PetOx)

TABLE 3

Effects of Petox and Acids on Stability of Pellets Treated with 1% Phos. or Ascorbic acids to Extruded or Non-extruded Parboiled Rice Bran (peroxide value tested after weeks of storage at 38° C.)

| Sample | Treatment | 0 week | 2 week | 6 week | 9 week |
|---|---|---|---|---|---|
| TA01 | EB, 0 acid | 5.9 | 14.0 | 56.4 | |
| TA02 | EB, 1% P | 5.4 | 6.2 | 18.9 | |
| TA03 | NE, 0 acid | 8.4 | 25.2 | 64.6 | 86.6 |
| TA04 | NE, 1% P | 9.2 | 30.1 | 58.4 | |
| TA05 | EB, 1% A | 3.0 | 11.4 | 63.4 | |
| TA06 | NE, 1% A | 2.9 | 3.2 | 3.0 | 6.49 |

Notes:
Peroxide value tested after x weeks of storage at 38° C.
EB = Extruded Bran
P = Phosphoric Acid
NE = Non-extruded Bran
A = Ascorbic Acid

TABLE 4

Effects of Ascorbyl Palmitate on Stability of Pellets Made from Extruded or Non-extruded Parboiled Rice Bran

| Sample | Treatment | 0 week | 2 week | 6 week |
|---|---|---|---|---|
| Control | Extruded bran, 0 acid | 5.500 | 23.500 | 82.400 |
| AP03 | Extruded bran, .3% Ascbl. Palmitate | 0.264 | 0.808 | 4.000 |
| AP05 | Extruded bran, .5% Ascbl. Palmitate | <0.1 | 0.716 | 2.400 |
| AP10 | Extruded bran, 1.0% Ascbl. Palmitate | <0.1 | 0.122 | 1.500 |
| AA10 | Non-Extruded bran, 1.0% Ascorbic acid | 1.940 | 1.720 | 13.500 |

Notes:
Peroxide value tested after x weeks of storage at 38° C.

TABLE 5

Oxidation Stability of Ascorbyl Palmitate Treated Rice Bran Pellets (Indicated by PV test results on samples stored at 38° C.)

| Code | Treatment | 0 week | 2 week | 4 week | 6 week |
|---|---|---|---|---|---|
| T325CK | control, no treatment | 5.5 | 23.5 | 54.6 | 82.4 |
| T32503AP | 0.3% ascbyl palmtte, EB* | 0.26 | 0.8 | 1.7 | 4.07 |
| T32505AP | 0.5% ascbyl palmtte, EB | 0.1 | 0.7 | 1.4 | 2.4 |
| T32510AP | 1.0% ascbyl palmtte, EB | 0.1 | 0.1 | 0.6 | 1.5 |
| T32510AA | 1.0% ascorbic acid, NEB | 1.9 | 1.7 | 6.9 | 13.5 |

EB: extruded parboiled rice bran
NEB: non extruded parboiled ricebran
No other antioxidants were added.
All samples were made from complete recipe, including minerals and vitamins as previous discussed.

While extrusion is the current method used in stabilizing nonparboiled or paddy rice bran, it is not affective on parboiled rice bran. Extrusion destroys the enzymes in paddy rice bran, but it does not destroy the natural antioxidants present in the rice bran. In parboiled rice bran, the enzymes are also destroyed through extrusion, but additionally the natural antioxidants are destroyed in the parboiling thermal process, which results in oxidation of the bran oil. The acids can function as antioxidants as well as metal atom sequesters. The acid reduces bran oil oxidation and, which in turn, reduces secondary degradation of short chain carbonyls and rancidity.

One skilled in the art will readily appreciate that the present invention is well adapted to carry out the objectives and obtain the ends and advantages mentioned, as well as those inherent therein. The inventive method for the stabilization of parboiled rice bran and food products incorporating the parboiled rice bran described herein are presently representative of the preferred embodiments, are exemplary, and are not intended as limitations on the scope of the invention. Changes therein and other uses will occur to those skilled in the art which are encompassed within the spirit of the invention and are defined by the scope of the claims.

What is claimed is:

1. A method of stabilizing a parboiled rice bran, the method comprising adding an edible acid having antioxidative properties to parboiled rice bran to maintain the stability of the bran for at least a six month period of time at ambient conditions.

2. The method of claim 1, wherein the acid is selected from a group comprising of ascorbic acid, ascorbyl palmitate, and phosphoric acid.

3. The method of claim 1, wherein parboiled rice bran is incorporated into a food product.

4. The method of claim 3, wherein the food product is selected from a group comprising food products for human consumption and food products for animal consumption.

5. The method of claim 4, wherein the food products for animal consumption includes food products for horses, dogs and cats.

6. A method of stabilizing a parboiled rice bran for use in a food product, the method comprising adding an edible acid having antioxidative properties to a parboiled rice bran food product in an amount of about 0.10% to about 2.0% by weight to maintain the stability of the food product for at least a six month period of time at ambient conditions.

7. The method of claim 6, wherein the acid is selected from a group comprising of ascorbic acid, ascorbyl palmitate, and phosphoric acid.

8. The method of claim 7, wherein the acid is ascorbic acid in an amount of about 0.25% to about 1.5% by weight.

9. The method of claim 7, wherein the acid is ascorbyl palmitate in an amount of 0.10% to about 1.5% by weight.

10. The method of claim 6, wherein the parboiled rice bran food product is mixed with an animal food product selected from the group comprising powder, pellets, extruded shapes, wet pet food, semi-moist pet food, dry pet food, pet treats, a pet drink and a pet food additive.

11. An animal feed comprising an amount of stabilized parboiled rice bran, the animal feed generally including at least about 6 to 18% protein, about 1–2% to 29% fat, and optionally starch sources, wherein the parboiled rice bran is stabilized by the addition of an edible acid having antioxidative properties to the parboiled rice bran to maintain the stability of the animal feed for at least a six month period of time at ambient conditions.

12. The animal feed of claim 11, wherein the acid is selected from a group comprising ascorbic acid, ascorbyl palmitate, and phosphoric acid.

13. The animal feed of claim 12, wherein the acid is ascorbic acid in an amount of about 0.25% to about 1.5% by weight.

14. The animal feed of claim 12, wherein the acid is ascorbyl palmitate in an amount of 0.10% to about 1.5% by weight.

15. The animal feed of claim 11, wherein the animal feed is in a form selected from the group comprising powder, pellets, extruded forms and a coarse mix.

16. The animal feed of claim 11, wherein the feed is for horses.

17. The animal feed of claim 11, wherein the stabilized rice bran is selected from a group of animal feeds comprising stabilized rice bran only, stabilized rice bran fed in combination with other kinds of roughage, stabilized rice bran fed with a nutritionally complete feed, stabilized rice bran as a partial replacement of an ingredient in a nutritionally complete feed, and stabilized rice bran as one component of a complete feed mix.

* * * * *